United States Patent [19]

Rabeneck et al.

[11] 4,190,690
[45] Feb. 26, 1980

[54] MANUFACTURE OF SEALED-END TUBULAR THERMOPLASTIC NET BAGGING

[75] Inventors: Kenneth H. Rabeneck, Louisville; Jerry R. Kantlehner; David E. Gallaher, both of Prospect, all of Ky.

[73] Assignee: Gallaher, Kantlehner & Associates, Inc., Louisville, Ky.

[21] Appl. No.: 945,020

[22] Filed: Sep. 22, 1978

[51] Int. Cl.² .................... B29C 17/00; B29D 31/00; B29E 27/00
[52] U.S. Cl. ........................................ 428/35; 156/73.2; 206/390; 206/554; 229/53; 264/23; 264/157; 264/103; 264/159; 264/248; 264/258; 264/280; 264/285; 264/320; 428/198; 428/255; 264/DIG. 81; 264/296
[58] Field of Search .......... 264/23, 157, 159, DIG. 81, 264/257, 258, 210 F, 339, 248, 280, 285, 296, 103, 320; 428/35, 255, 398, 198; 229/53; 206/554, 390; 156/73.2; 53/479, 483, 370

[56] References Cited

U.S. PATENT DOCUMENTS

| | | | |
|---|---|---|---|
| 2,289,668 | 7/1942 | Mallory | 53/453 |
| 2,545,243 | 3/1951 | Rumsey | 53/441 |
| 2,700,855 | 2/1955 | Ketchpel | 53/227 |
| 2,708,684 | 5/1955 | Grieve | 53/227 |
| 3,003,304 | 10/1961 | Rasmussen | 156/73.2 |
| 3,017,314 | 1/1962 | Kebekus | 156/498 |
| 3,051,989 | 9/1962 | Mercer | 264/DIG. 81 |
| 3,184,354 | 5/1965 | Strother | 156/73.2 |
| 3,257,915 | 6/1966 | Cartier et al. | 229/53 |
| 3,279,149 | 10/1966 | Latini et al. | 53/370 |
| 3,308,220 | 3/1967 | Smith | 264/DIG. 81 |
| 3,389,533 | 6/1968 | Tipper et al. | 53/417 |
| 3,432,980 | 3/1969 | Seiferth et al. | 53/417 |
| 3,452,505 | 7/1969 | Hoag | 53/479 |
| 3,479,788 | 11/1969 | Dreyfus | 53/463 |
| 3,540,184 | 11/1970 | Ashton | 53/479 |
| 3,732,662 | 5/1973 | Paxton | 53/417 |
| 3,763,621 | 10/1973 | Klein et al. | 53/483 |
| 3,780,488 | 12/1973 | Herrell | 53/417 |
| 4,091,595 | 5/1978 | Pelster et al. | 53/14 |
| 4,143,199 | 3/1979 | Bardon et al. | 428/399 |

FOREIGN PATENT DOCUMENTS 694269 7/1953 United Kingdom .................... 53/483

*Primary Examiner*—W. E. Hoag
*Attorney, Agent, or Firm*—Cushman, Darby & Cushman

[57] ABSTRACT

A tube of thermoplastic netting is drawn through a work station in a radially collapsed, condensed condition. At the work station, the netting is angularly twisted to rope-like form, to increase its bulk density and, in such condition, is drawn between the die and platen of an ultrasonic welding horn. Periodically, the die and platen momentarily bear against a succeeding short length of the twisted, condensed rope-like form making a fused seal nugget integrating all strands of the netting at that site. The resulting product may be a long length of such tubing, having such a seal every so often, or a plurality of bags formed from the intermediate product by making one transverse cut through the netting tube beside each seal nugget.

16 Claims, 11 Drawing Figures

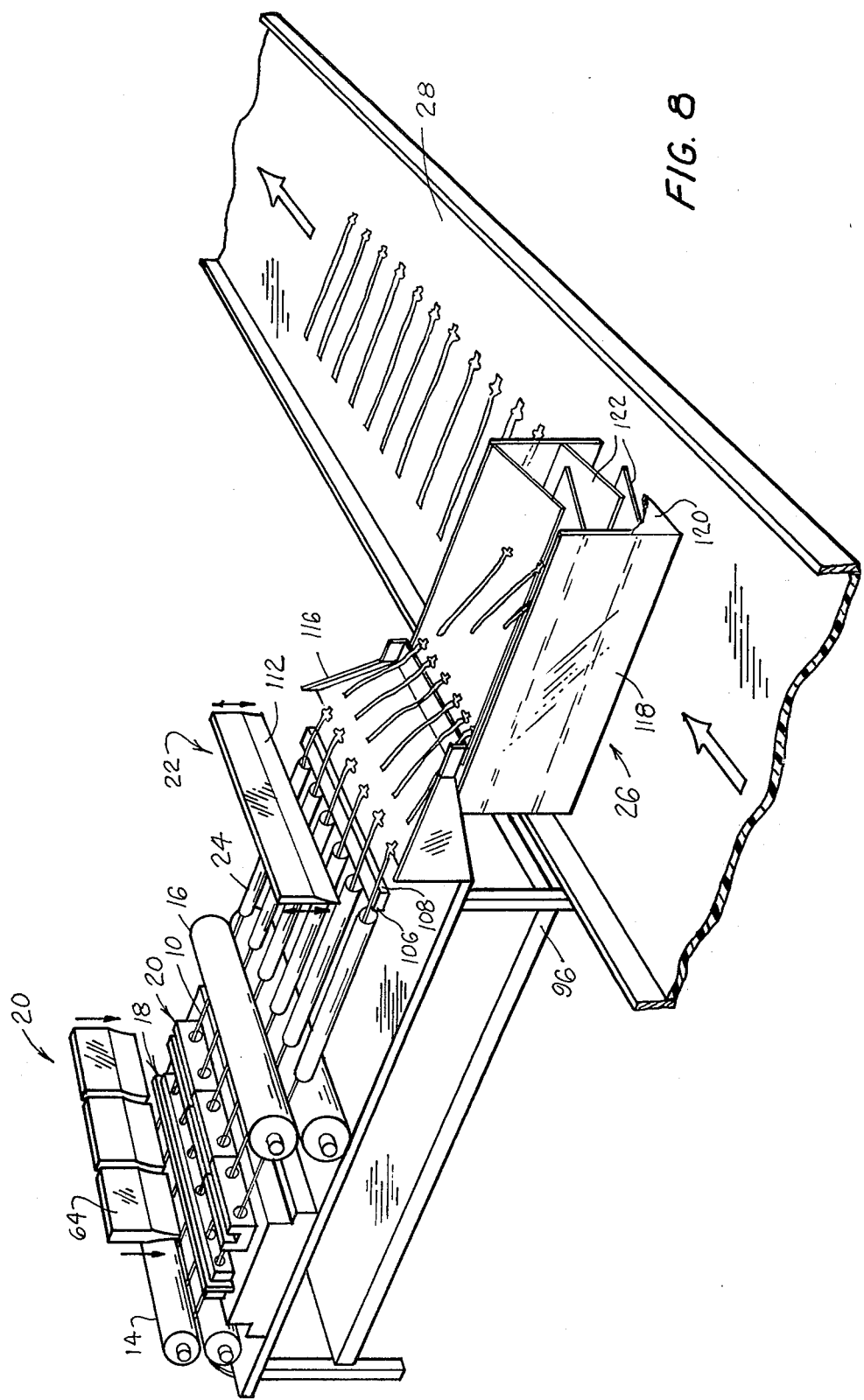

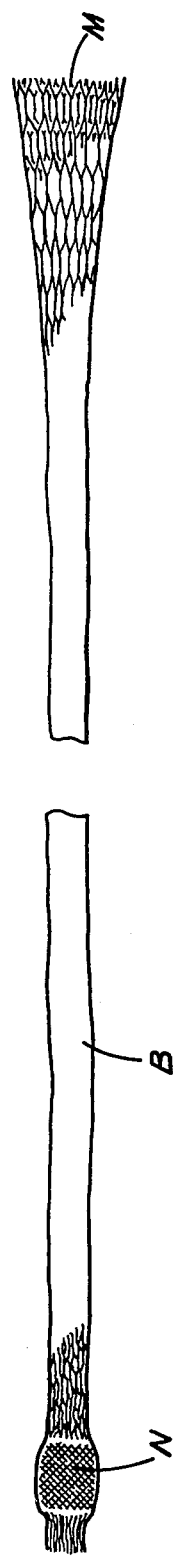
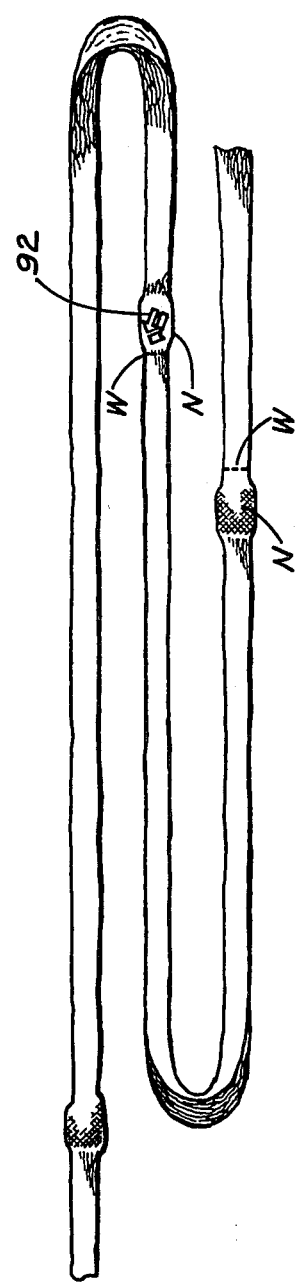

MANUFACTURE OF SEALED-END TUBULAR THERMOPLASTIC NET BAGGING

SUMMARY OF THE INVENTION

One sort of tubular netting of thermoplastic material which may be used to make the product of the present invention also is the raw material for the process described in the U.S. Pat. of Kebekus, et al, No. 3,017,314, issued Jan. 16, 1962. In Kebekus, et al, the netting is advanced through a work station where it is radially constricted at two axially slightly spaced points and periodically is simultaneously heat welded and severed between these two points, then cooled—thus adjacently making the bottoms of what is to become two bags.

A recently issued U.S. Pat. of Pelster, et al, No. 4,091,595, issued May 30, 1978 shows a manufacture at the bag filling station, of plastic netting bags made from the preferred material, Dupont's Vexar plastic mesh tubing.

Although the resulting kind of bag has myriad uses, presently it is best known to most consumers as the plastic netting bag in which grapes, oranges, onions and the like often are sold in supermarkets. Marbles are typical of a non-food product which can be packaged in similar material. This kind of bag is in increasing demand for use in place of plastic film bags, for packaging products which do not require envelopment by a complete vapor barrier.

A further use is to permit foodstuffs and the like to be soaked in a processing fluid while individual quanta thereof are segregated into individual fluid-permeable packages. Typical is the marination of pre-sorted, preselected amounts of cut-up chickens, e.g. the whole or a proportional amount of the cut-up chicken which will be cooked in the same batch at a fast food retail store which features fried chicken.

In small-scale packaging operations, individual bags such as are produced using hot knife thermal welding with simultaneous bag cut-off, are conveniently used. With larger scale operations, particularly for use with produce-bagging machinery which is at least partially automated, often the most efficiently useful product is a continuous "rope" of potential netting bags produced by gathering and sealing the netting strands every so often along the length of the rope. The rope can be payed off a roll and successively cut through next to each seal to successively make individual bags. In other words, for such a product, severing operation is not performed simultaneously with the gathering and sealing, and may be performed, e.g. by a customer at a field location, rather than by the manufacturing entity which made the intermittantly sealed rope. Further, the spooled, intermittently sealed rope of tubular thermosplastic netting material may serve as a supply of bags to an automated bagging machine (not part of the present invention) which successively pays out, fills, closes and severs the leading bag of the rope. A similarly desirable product is a boxed coil of such rope of bag precursors in series. Another, is a transparent package of a plurality of individual, empty bags. The package having a grabhole in its side wall through which the bags may be individually withdrawn for filling.

Paxton, U.S. Pat. No. 3,732,662, issued May 15, 1973 shows packaging goods into tubular netting using a "sausage-stuffing" technique. When the tube terminal portion holds a full quantum of goods, it is manually spun, mechanically clamped, and cut off.

Herrell, U.S. Pat. No. 3,780,488, issued Dec. 25, 1973 shows that it is known to seal a non-twisted, tubular thermoplastic film, simply gathered and clamped between an ultrasonic horn and anvil to form a package end.

It has been found that if one radially gatheringly condenses a tube of thermoplastic netting and attempts to make a seal using an ultrasonic horn and anvil, quite commonly two, three or several separate seal nuggets and sometimes a fray are formed. These are not integrated into a separate seal and results in bags having one or more weak sections or gaps in their bottoms. While, but for having an undesirably nonuniform appearance, such bags could be used to package larger items, such as large onions, which are not likely to fall out through small gaps in the bag bottom, these bags cannot be used to reliably package small items such as grapes or marbles.

SUMMARY OF THE INVENTION

A tube or thermoplastic netting is drawn through a work station in a radially collapsed, condensed condition. At the work station, the netting is angularly twisted to rope-like form, to increase its bulk density and, in such condition, is drawn between the die and platen of an ultrasonic welding horn. Periodically, the die and platen momentarily bear against a succeeding short length of the twisted, condensed rope-like form making a fused seal nugget integrating all strands of the netting at that site. The resulting product may be a long length of such tubing, having such a seal every so often, or a plurality of bags formed from the intermediate product by making one transverese cut through the netting tube beside each seal nugget.

The present inventors have found that if the condensed tubular netting also is twisted significantly, when an ultrasonic seal is made, all of the netting strands are consolidated at the site of the seal into a monolithic seal nugget with no separated strands and no frays. The material resulting from being sealed in accordance with the present invention may be fully cut across next to each seal by the manufacturer into individual bags; or it may be partially cut through fully across its width next to each seal to make lines of weakness that will permit a customer to sever the lead bag from the rope by giving it a sharp tug, or the intermittantly transversally sealed rope may be sold in a spool-wound, coiled-in-box or similar form with neither full nor partial severing, e.g. when the severing step is to be conducted on the customer's bagging machinery.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

FIG. 8 is a perspective view of the apparatus, from its output end, when the apparatus is equipped for severing the intermittantly sealed netting stock into individual bags aligned in a series of transversally oriented individual bags on a take away conveyor;

FIG. 9 is a fragmentary frontal perspective view of a single netting bag produced in accordance with the present invention.

FIG. 10 is an intermediate portion of a rope of netting bags produced in accordance with the present invention;

GENERAL DESCRIPTION

Figure 1:
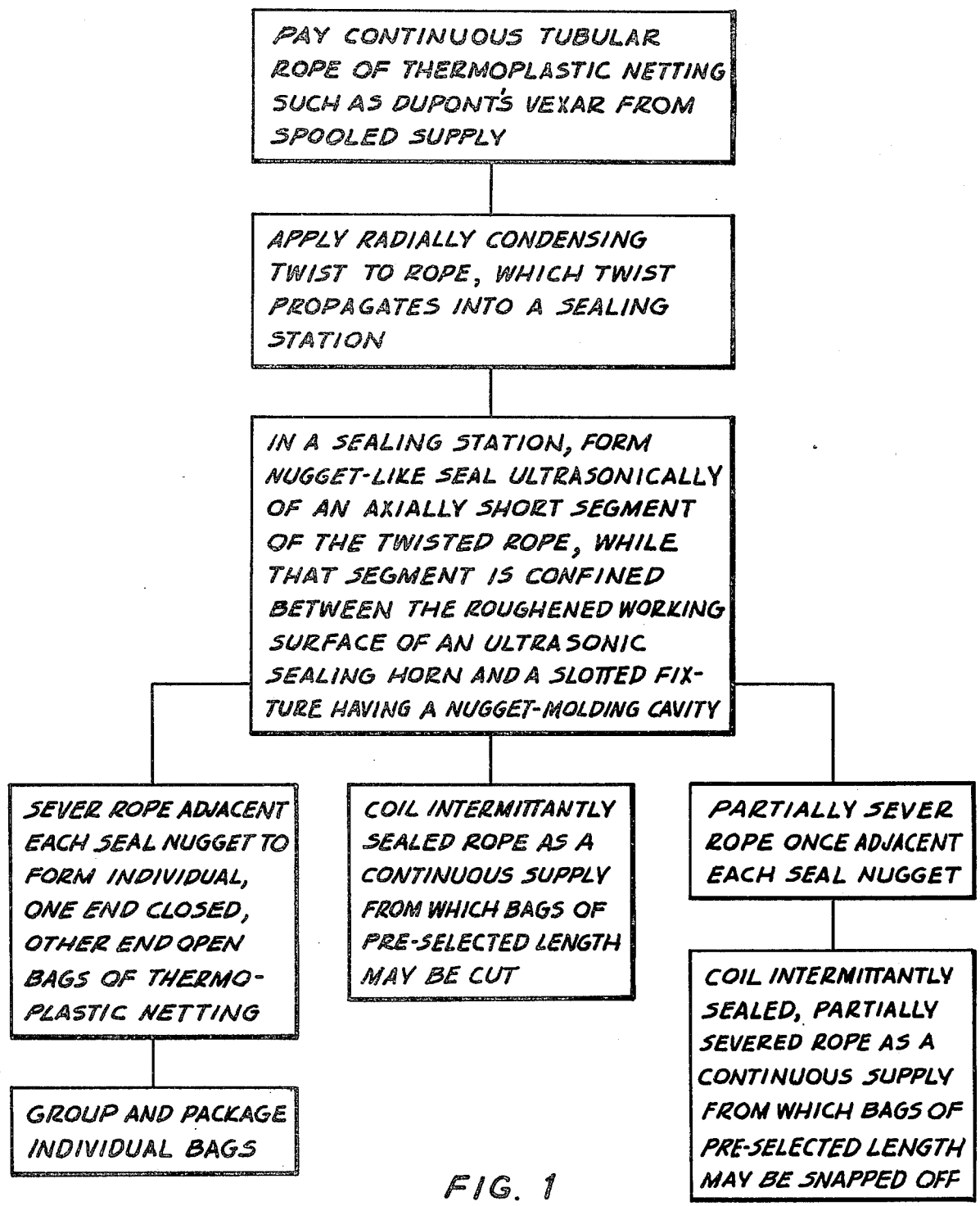
FIG. 1 is a schematic diagram of a process for producing bagging in accordance with principles of the present invention.
Figure 2:
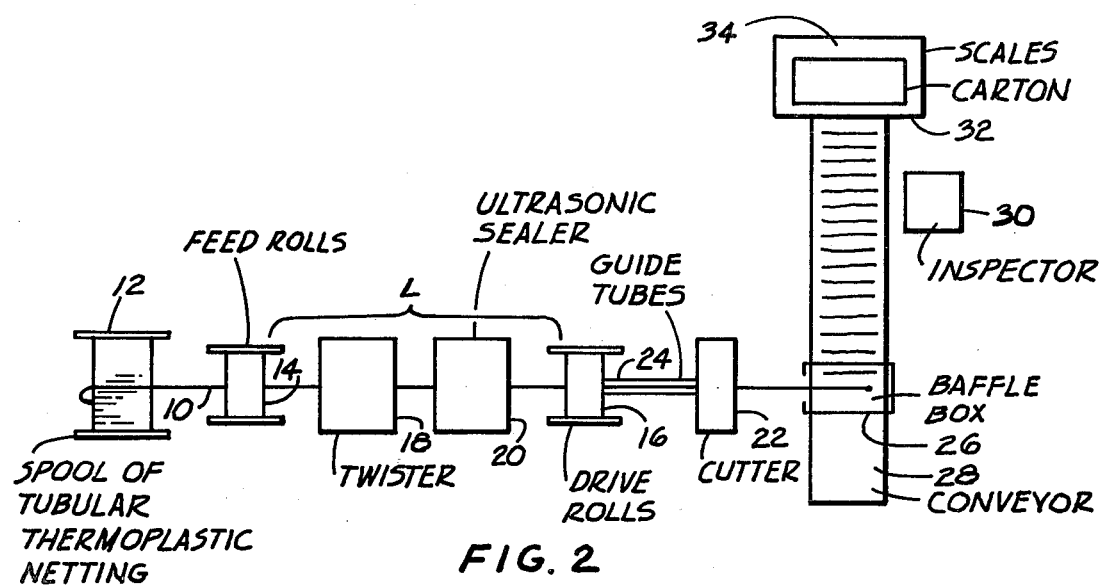
FIG. 2 is a somewhat schematic top plan view of a generalized form of the apparatus.

As illustrated in FIGS. 1 and 2, in a preferred embodiment, the process may be conducted as follows.

A continuous tubular rope 10 of thermoplastic netting, such as Dupont's Vexar is unreeled from a spooled supply 12 and is guided through a set of intermittantly rotated feed rolls 14. Downstream, the rope of netting passes through another set of coordinately intermittantly rotated feed roll 16.

Between the two sets of feed rolls 14, 16, are a twisting station 18 and a sealing station 20.

At the twisting station, after the rolls 14, 16 have stopped advancing the rope 10, and thus are holding a length L of the rope 10 gently tensioned therebetween, the rope length L is given an angular twist at the station 18, of a sufficient number of turns as to substantially maximally radially condense the rope length L, at least in the vicinity of the sealing station.

While the number of twists is maximized at the twisting station, and progressively decrease upstream and downstream of the twisting station, the sealing station 20 is so close to the twisting station that substantially maximal condensation persists at the sealing stations. The number of turns needed is a function of the length L and the relative locations of the twisting and sealing stations within it, and of the initial condition of the incoming feed stock of thermoplastic tubular netting 10. Typical, is the production of a ten-turn twist (3600 degree) at the twisting station 18 in order to provide a seven turn twist (2520 degree) at the sealing station 20.

At the sealing station, an axially short segment of the substantially fully radially condensed feed stock, while being confined against laterally spreading out, is contacted with a sealing device, preferably an ultrasonic sealing horn in order to melt all of the strands in the segment into a massive seal nugget. The sealing device withdraws in time for the next unit advance of the feedstock.

That advance carries the newly formed seal downstream to a region where the thermoplastic tubular netting, converted by having said seal may be simply wound up again, or subjected to a cutting operation at a cutting station 22.

At the cutting station, the converted feedstock is cut across the width thereof beside the seal nugget. The cutting operation takes place between succeeding intermittant advances of the feedstock. The cut is either partial, so as to leave the rope physically intact, yet with a line of weakness along which, if the rope is grasped and pulled, it will sever, or is fully cut in two.

If the cutting is partial, the thus further-converted rope is reeled up and packaged, e.g. as a coil in a carton. The customer of such a product, typically a grocery chain, can supply this product, e.g. to its produce departments, where the cartons may be hung or otherwise stationed where produce is being bagged. The bagger need only pull out enough of the converted rope as to pass a seal nugget, then sharply tug in order to sever the rope at the pre-cut line of weakness beside the seal nugget, thus separating a bag from the leading end of the converted stock.

(If the coiled converted stock is sold without such partial pre-cutting, it may still be packed in a similar way. However, in such an instance, the user is provided with a razor knife or the like to cut the rope next to each seal nugget in order to separate bags from the converted rope, as needed.)

As generally illustrated in FIG. 2, in the preferred embodiment, at the cutting station, the converted rope is completely severed next to each succeeding seal nugget in order to serially produce individual bags at the downstream end of the converted rope.

Because the cutting station 22 is downstream of the feed rolls 16, an e.g. transparent tube 24 is provided so that it longitudinally extends between the downstream side of the rolls 16 and the upstream side of the cutting station 22. The converted rope is thus pushed downstream by the rolls 16, and it passes through the tube 24, which keeps the rope on target heading into the cutting station 24.

In the presently preferred embodiment the cutting station includes knife means in the cutting station 24, which cuts across the converted feedstock just upstream of each succeeding seal nugget. Thus each bag B, as it is created, is already mostly past the cutting station, so that it may drop from the cutting station through a baffle box 26 and onto the upper run of a horizontal, endless conveyor belt 28. The purpose of the baffle box 26 is to lay each succeeding bag B onto the belt 28 so that it extends crosswise of the belt.

As opposed to the feeding at 14, 16, the sealing at 20 and the cutting at 22, all of which are carried out intermittantly in the preferred embodiment, the conveying at 28 is continuous. Thus, the succession of completed bags is carried past an inspection station 30 where, e.g. a human inspector is available for a culling from the line any damaged or imperfectly made bags.

Downstream from the inspection station, the bags B drop into a container such as a carton 32 that is supported on a weighing platform 34. The latter may be of a conventional electronic sort, in which a preselected gross weight figure may be dialed into the weighing apparatus. Such a weight would be one that equates to the weight of the empty carton plus the weight of the number of bags which are to be packed in that carton. When the dialed-in weight is reached, as succeeding bags roll off the forward end of the conveyor belt 28 and into the carton 32, a belt, buzzer or other indicator is actuated, so an attendant may replace the filled carton with an empty one.

A suitable, utterly conventional control system (not illustrated) may be employed for coordinating the starting and stopping of the intermittantly operated elements, which may be powered by utterly conventional means (not illustrated) such as D.C. electric motor(s)

with appropriate drive train(s), pressurized fluid-powered piston and cylinder arrangement(s), and the like.

DETAILED DESCRIPTION OF THE PRESENTLY PREFERRED EMBODIMENTS OF THE INVENTION

Presently, E. I. Dupont de Nemours & Co. of Wilmington, Del. markets as tubular packaging material and as stock therefore spool-like coiled supplies of tubular thermoplastic netting which is very diaphanous, so that when it is made into bags and radially outwardly expanded, much produce or other articles may be contained within the tube, using very little plastic material. Similar material is available from other manufactures. A typical plastic for the material is polyethylene or polypropylene.

The aforementioned U.S. patent of Pelster, et al shows Vexar thermoplastic mesh tubing spooled in the manner in which it is customarily supplied to converters or packagers. As is notable from Pelster, et al, the thermoplastic mesh tubing, as received, is in a significantly radially condensed condition, but it is not significantly angularly twisted. Thus, Pelster, et al are enabled to simply pay the supply convolutely off the roll and radially expand it over a mandrel in their process in which expansion at the cutting and sealing station is an essential.

Conversely, in the present process, at the sealing station, the supply is wanted in a substantially fully radially condensed condition, in which further condensation from the as-unreeled not significantly twisted condition is achieved by applying an angular twist to the stock being unspooled. One way that a certain, but usually insufficient amount of radially condensing twist can be imparted to the stock being unspooled is to pull it axially off one end of the coiled supply without rotating the supply spool. That imparts one twist per instantaneous length of coil. However, as the coil diminishes in diameter the number of complete twists thus imparted per unit length of stock will increase. But beyond this continuously changing variable, the amount of twist thus imparted in most instances would produce insufficient radial condensation to permit secure and complete sealing at the ultrasonic horn.

Accordingly, such an uncoiling method would generally not be used alone, and, in fact, when more convenient to do so, the stock may be uncoiled convolutely, exactly as in Pelster, et al.

Although, in theory, it might be possible to obtain the spooled tubular netting feedstock in an already maximally radially condensed, significantly angularly twisted condition, there are reasons why, so far, that has proved impractical. The netting is produced by extruding a tube, intermittently slitting it, and longitudinally stretching it, then reeling it onto a spool, all in a continuous process. Producing a twist would call for putting the winding-up apparatus on a spider which revolves angularly about the wind-up path. Also, during storage on the spool, the feedstock would tend to take a set in its twisted condition, making later opening and filling of the resulting bags too difficult. There are conceivable economic conditions, however, under which pre-twisting could become attractive.

Figure 3:
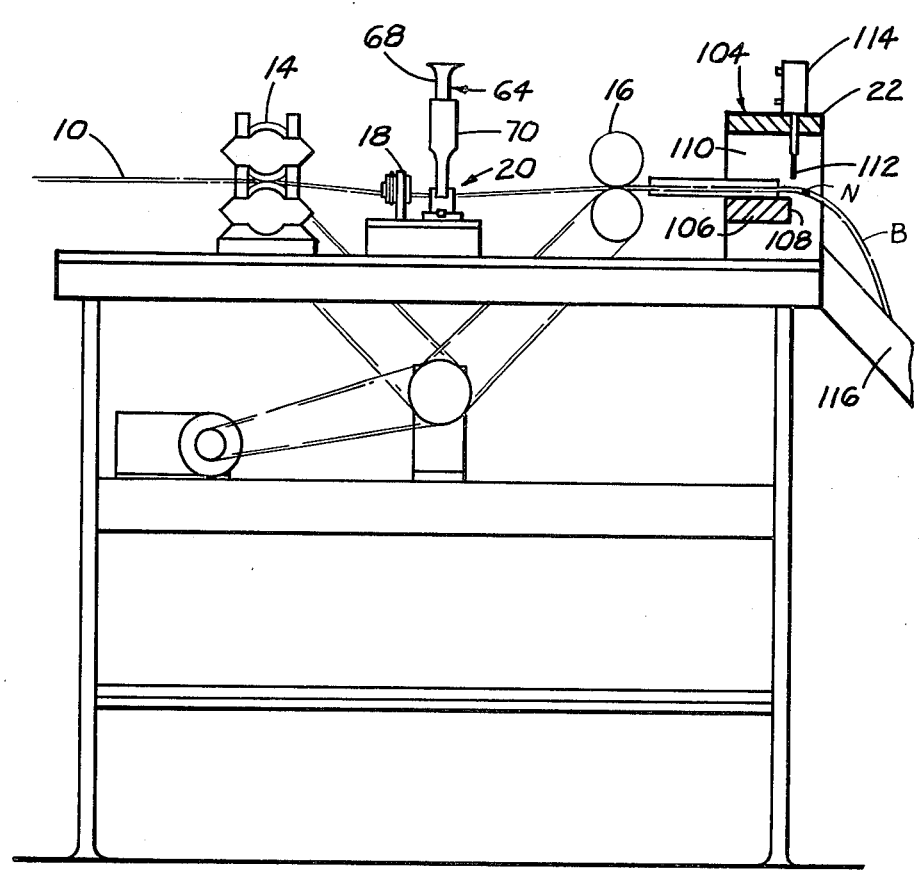
FIG. 3 is a side elevation view of apparatus for carrying out important intermediate steps in the process.

At the stage depicted in FIG. 3, the incoming stock 10 of thermoplastic tubular netting has been uncoiled from a spooled supply, either convolutely, with spool rotation, or over an axial end of the spool, without spool rotation.

Although it is possible to conduct the process using a single, condensed tube of feedstock, it is considered generally much more economical to conduct the process simultaneously on several parallel feedstocks. Thus, in the drawings, e.g. FIG. 3, it will be noted that the process is being simultaneously conducted on six parallel feedstocks, grouped in twos. However, six is not a magic number; more or less feedstocks than illustrated could be processed on one correspondingly equipped set of apparatus.

Figure 4:
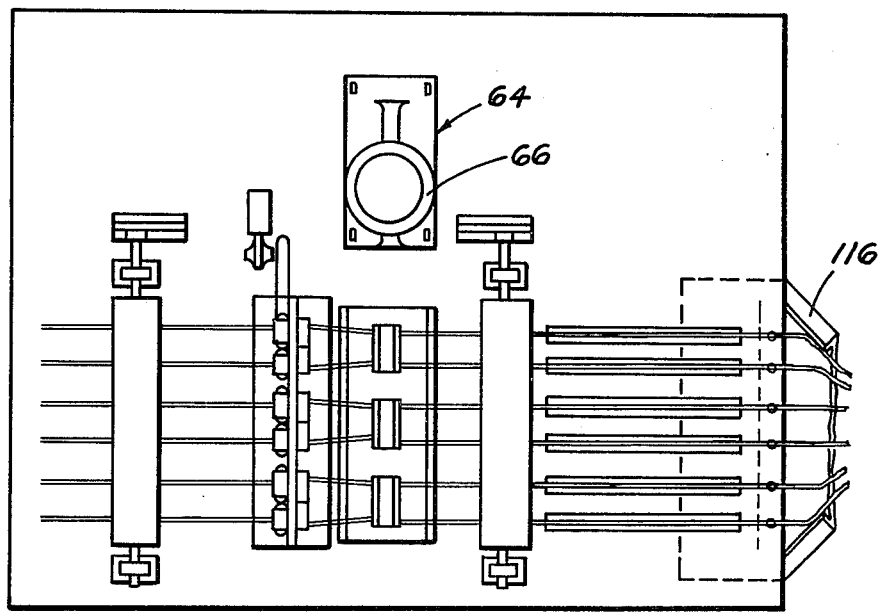
FIG. 4 is a top plan view of the apparatus shown in FIG. 3.
Figure 5:
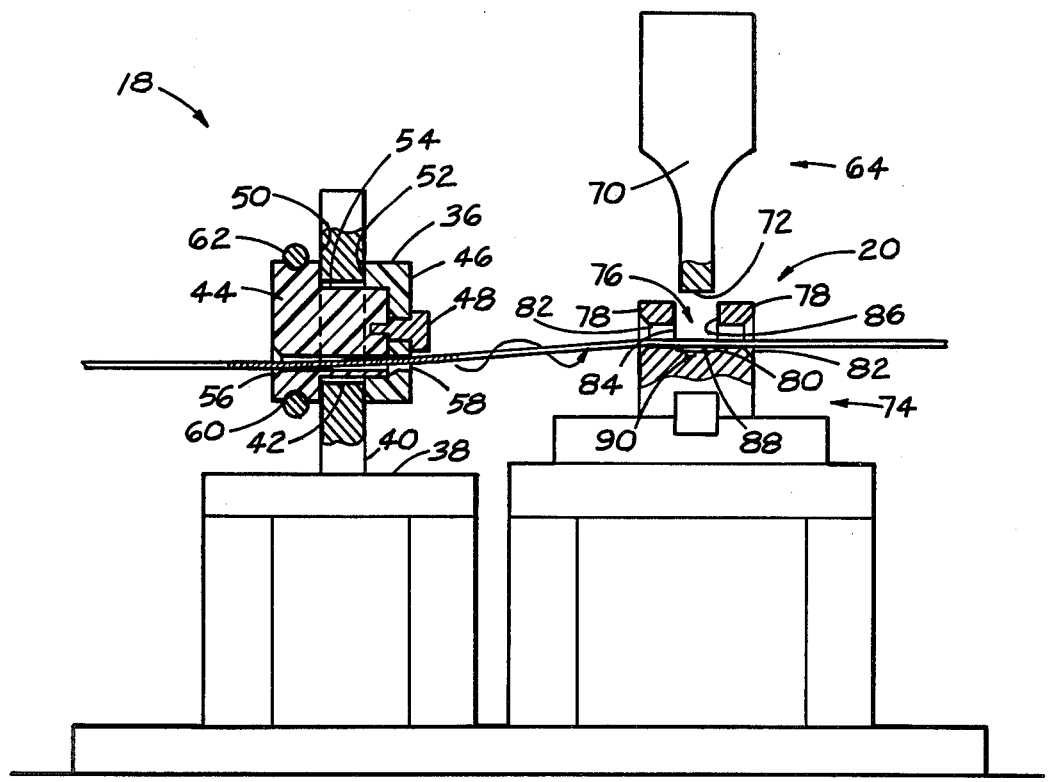
FIG. 5 is an enlarged scale side elevation view, with portions broken away and sectioned, of a portion of what is shown in FIG. 3.

FIGS. 3 and 4 show the twisting station 18 and the sealing station 20 disposed next to one another intermediate the upstream and downstream sets of feed rolls 14 and 16. FIG. 5, shows the twisting station 18 and the sealing station 20 by themselves and in more detail.

At the twisting station 18, each rope of feedstock passes through a twisting fixture 36. The twisting station includes a frame 38, which includes an upstanding plate 40 having a plurality of circular openings 42 therethrough, one for each fixture 36. The fixtures 36 each comprise a pulley element 44 and a drag element 46, both preferably molded of lubricous plastic material such as nylon, fitted together through the hole 42 from opposite sides of the plate 40, and held together by a shoulder screw 48. The association is such that although these parts are held together, the pulley element 44 is free to turn relative to the drag element 46. Opposed axially facing surfaces 50, 52 and radially outer surface 54 provide simple bearings for rotation of the twisting fixture relative to the twisting frame. Of course more elaborate bearings can be provided where desired. At correspondingly eccentric sites, openings 56 and 58 are formed respectively through the pulley element 44 and the drag element 46. The feedstock 10 is threaded through both openings 56 and 58. This fact, and the light tension provided between the feed rolls 14, 16, ensure that the respective openings 56 and 58 in the same twisting fixture remain generally in coaxial alignment, at a lateral offset from the rotational axis of the respective twisting fixture 36.

The fit of the feedstock through the openings 56,58 when these openings are aligned is a snug yet sliding fit, somewhat like that of a shoelace in a shoe vamp eyelet. Each pulley element 44 is provided with an external radially outwardly opening circumferential groove 60. A drive belt 62 is entrained about each pulley element, in the respective groove 60 thereof. Thus, when the drive belt is intermittently driven, all of the pulley elements 44 are rotated by the same angular amount.

Because the drag elements 46 are not rigidly, drivingly connected to the respective pulley elements 44, they tend to angularly trail the respective pulley elements during rotation. The result is that as rotation is begun, a slight angular offset is created between the normally coaxially aligned openings 56, 58. Thus, the respective feedstocks 10 are slightly pinched at the respective interfaces 56/58. The pinching action is sufficient to ensure that as each twisting fixture 36 rotates, with the respective feedstock 10 eccentrically held, each respective feedstock is provided with a number of angular twists, sufficient to substantially fully radially condense the respective feedstock in the vicinity of the sealing station.

After the twisting fixtures having been rotated, the sealing apparatus at the sealing station 20 is operated to form a seal nugget on the short segment of each angularly twisted rope of feedstock that is within the sealing station at that time.

Then the sealing apparatus retreats from the thus-nuggeted feedstocks, and the feed rolls 14, 16 are operated to advance the respective feedstocks by one bag length. At this time, the twisting fixtures are not rotating, so the respective openings 56, 58 tend to coaxially align. Thus, while the fixtures grip and hold the feedstocks while the feedstocks are being angularly twisted, the feedstocks may be easily pulled forward during the feedstock advancing step, as the gripping action of the twisting fixtures becomes immediately relaxed.

In the presently preferred embodiment, the sealing accomplished at the sealing station 20 is accomplished by means of frictional heat created in the molecular structure of the feedstock, due to the temporary application of an ultrasonic sealing horn to a confined segment thereof.

Ultrasonic sealing devices per se, having reciprocable, automatically controlled horns per se are well known; one commercially avialable device that is suitable for use in the process of the present invention is Branson, Model 400 Series manufactured by Branson Sonic Power Co., of Danbury, Conn.

As available, an ultrasonic sealing device 64 has a housing 66 within which a crystal (not illustrated) is excited to produce ultrasonic vibrations, which are delivered to an output head 68 that is mounted on the housing 66 to be reciprocated vertically in response to control signals. Typically, the head 68 has one or more ultrasonic sealing horns 70 mounted thereon, these being typically spatulate elements designed to focus the ultrasonic waves travelling therethrough, toward an axially outer end (usually lower end) working surface 72.

In practice, it is common in ultrasonic sealing operations to use an ultrasonic sealing device in combination with a support fixture for properly holding and supporting the material that is to be sealed. The ultrasonic sealing horn and support fixture associate in use approximately as respectively do the movable platen and fixed bed of a press.

In the present instance, the ultrasonic sealing device 64 output head 68 is shown having one ultrasonic sealing horn 70 of generally the same shape as a flat-bladed screw driver head, with the respective working surfaces 70 at the respective lower ends. This ultrasonic sealing horn is mounted to move vertically toward and away from three respective support fixtures 74.

Each associated ultrasonic sealing horn 70 and support fixture 74 pair is juxtaposed to operate upon two feedstocks 10, so the three pairs together serve all six feedstocks. As aforementioned, this doubling up and the particular number of feedstocks is subject to variation to accommodate processing less or more feedstocks, or the same number of feedstocks in a different arrangement, e.g. one horn for all three support fixtures; two groups of three instead of three groups of two; two horns for one support fixture, etc.

Some important modifications have been made in order to suit commercially available ultrasonic sealing equipment for use in the process of the present invention. What follows are some of the details, set forth with respect to one ultrasonic sealing horn and one support fixture.

Figure 7:
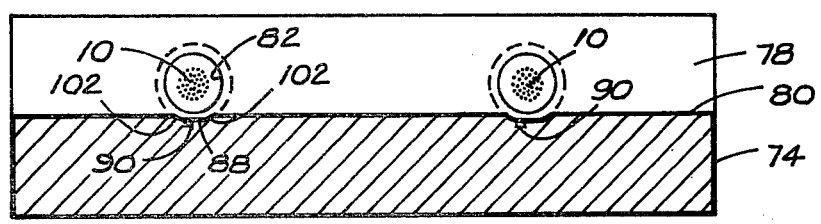
FIG. 7 is a fragmentary vertical transverse sectional view of the welding horn and platen forming a seal nugget between them.
Figure 6:
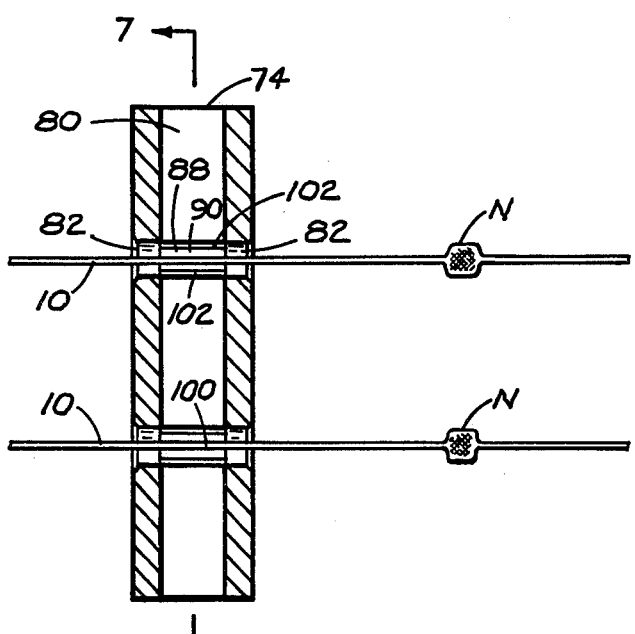
FIG. 6 is an enlarged scale top plan view, with portions broken away and sectioned of what is shown in FIG. 3.

The support fixture 74 is illustrated in FIGS. 3–7, and its details are most apparent from FIGS. 5–7.

In general, the support fixture 74 is constituted by a short length of rectangular-sectioned metal bar stock having a deep slot 76 running axially centrally along the length of the upper side thereof, bordered by two thus-created upstanding flanges 78. Somewhat below tangency with the floor 80, two openings 82 are drilled horizontally transversally through the bar stock so that most of what is removed to make the holes once was part of the flanges 78, but a small amount once was part of the bar stock at and just below the floor 80. The two laterally spaced openings 82 enter through the upstream face 84 of the fixture 74 and exit through the downstream face 86.

In order to create somewhat larger-volume molding cavities 88 in the support fixture, the shallow concave grooves created in the floor 80 when the openings 82 are drilled may be enlarged, as illustrated, by milling out more material. However, it is preferred that the profile of each molding cavity 88 (FIG. 7), remain generally upwardly cylindrically concave.

As a further modification, by preference, a trademark or other logo, e.g. of the converter, the bag manufacturer, the netting supplier, the bagging material customer, or the produce marketer, may be provided in relief in each molding cavity 88 as illustrated at 90. Thus, as each seal nugget is formed, it is provided with a raised logo 92 (FIGS. 9 and 10) which helps make the bag traceable as to its source. The logo 92 may be a pictographic design, or character symbols such as numbers and/or letters, or combinations of such. (What is illustrated is a double arrow logo indicating origin in Gallaher, Kantlehner and Associates, Inc. of Louisville, Ky.)

In practice, the support fixture 74 is mounted on a sealing station frame 94, that in turn, is mounted on the main frame 96 of the device of the invention, just downstream from the twisting station 18.

The ultrasonic welding horn 70 is modified by having a roughened finish 98 on the working surface 72 thereof. By preference, the roughened finish is a medium female knurl 98; other types of roughening, such as sand-blasting could be used. The main purpose is to effectively overcome the tendency of the ultrasonic vibrations, when transmitted to the feedstock to undesirably laterally spread the feedstock. Too often, if the working surface 72 were smooth, some strands of the feedstock would be displaced laterally and not be fully consolidated into the seal nugget.

As an elaboration, the knurling or other roughening may incorporate a logo to serve in place of or in addition to the logo 90.

By preference, what happens at the sealing station is the following. Starting from a point in time at which the horn 70 is withdrawn from the fixture 74, the feedstock has been advanced another bag length, and the twisting station has operated to angularly twist the feedstock now at the twisting and sealing stations sufficiently to substantially fully radially condense the feedstock segment 100 that is now superimposed upon a respective molding cavity 88, the ultrasonic welding horn 70 is indexed downwardly so that it enters the slot 74 and its working surface 72 comes into engagement with the feedstock segment 100. The ultrasonic vibrations are initiated in the device 64 and transmitted to the horn, which is pressed down on the feedstock segment 100, tending to force substantially all of the feedstock segment 100 into the molding cavity 88. The energy of the ultrasonic vibrations quickly creates such intense internal frictional forces in the thermoplastic material of the feedstock segment 100 that the material within the feedstock segment melts into a single, integral seal nugget N which incorporates substantially all of what previously were the individual, though interconnected strands of the netting 10.

At some running speeds with some plastic materials and at certain ultrasonic energy levels, it may be necessary to pause momentarily at this point in order to lead heat away from the nugget, either into the metal of the horn or fixture acting as a heat sink, or into cooling fluids which for that purpose may be conducted through internal channels within the ultrasonic sealing horn 70 and/or through the support fixture 74. However, the need for such meausres, the intensity with which they need to be applied, and means for accomplishing the same are easily within the competence of persons of ordinary skill in the thermoplastic molding art.

As the seal nugget is being formed, the proximity of the sealing horn to the fixture, limited by engagement of the horn working surface 72 with the shoulders 102 (the floor sections 80 beside the molding cavity 88) or the near approach of the horn surface 74 to the shoulders, limited by small ear-like portions of the nugget which may spread slightly laterally out of the cavity 88, yet remain contiguous with the remainder of the seal nugget N.

Once the seal nugget N has been formed, the horn 70 is withdrawn upwardly, out of the slot 76 and is ready for the next cycle.

In the variations of the preferred embodiment in which the end product of the process is either individual bags or a converted feedstock rope with perforation lines of weakness cut across next to each seal nugget, the cutting station 22 which is located downstream from the sealing station operates respectively to make a full or an intermittant cut beside the seal nugget N which was formed in the preceding cycle relative to the seal nugget that was just formed and still resides at the sealing station 20. Then, it is time for the feed rolls 14, 16 to advance the feedstock by another bag length, bringing the seal nugget that was just formed, to the vicinity of the cutting station 22 and a correspondingly new quantum of feedstock into the twisting and sealing stations.

Where, as shown, each converted feedstock is to be completely severed into a succession of bags B, the preferred instrumentality for performing the cutting step is a shear device. As shown, the shear device includes a bed plate 106 with a stationary cutting edge 108 at the downstream end thereof. A frame 110 over the bed plate near the downstream end mounds one or more shear knives 112 via guided vertically reciprocating means, such as a pressurized fluid-powered piston and cylinder arrangement 114 (the actuation of which is controlled and timed together with the rest of the apparatus of the invention). Accordingly, intermittantly, once during each cycle of operation, while the converted feedstock is not in the act of advancing, at a time when each converted feedstock rope has one bag's worth protruding downstream past the stationary cutting edge 108 of the shear device bed plate, so that on each such converted feedstock protruding portion, there is a unitary seal nugget located just upstream of that stationary cutting edge, the piston and cylinder arrangement 114 is actuated to momentarily thrust the shear knives down along the stationary cutting edge 108 in shearingly cutting relation therewith, thus lopping from the downstream, leading end of each converted feedstock, a respective bag B.

With regard to FIG. 9, each bag B is constituted by a selected length of tubular thermoplastic netting, open at a mouth M, and having a seal nugget N forming a massive, substantially fully integrated closure for the opposite end thereof. (The seal nugget N may be right "at" the end of the bag B, or a short distance downstream, typically one-half inch downstream, depending on the spatial relation of the cutting station 22 to the sealing station 20.) By preference each seal nugget N is embossed in the process of its formation as aforesaid, with identifying indicia typified both by the logo 92 and by the medium male knurling 116 (the latter an artifact of the medium female knurling 98 on the working surface 72. Any of a number of means may be used to close the mouth once the bag has been filled. No particular bag closure forms a part of the present invention. Typically useful presently available closures include hang tags stapled or adhered in place, twist ties and bread wrapper closures (key-slotted tags). In fact, the bag filler could use another ultrasonic welding horn to seal filled bags closed).

Where the desired product is a continuous rope of what will become bags B, as individuals are snapped off the leading end of the rope along respective transverse lines of weakness W formed beside each seal nugget N, e.g. just upstream of each seal nugget, a convenient way of accomplishing that is to replace the shear knives 112 with similar ones (not illustrated), which make intermittant perforations, rather than a continuous cut.

Where the desired product is a continuous rope of what will become bags B, as individuals are later cut off the leading end of the rope at the point of use, e.g. using a razor knife, the cutting station 22 simply may be deactivated and the converted feedstock merely coiled and spooled, cartoned or otherwise packaged for storage and/or shipment.

Referring back to FIGS. 2 and 8, and to the instance in which the output of the apparatus is at least one, six are shown, stream of a succession of individual bags B, e.g. being generated by the six at the leading ends of converted feedstock at the cutting station 22, the remainder of the process will be described in somewhat more detail.

An axially forwardly and downwardly obliquely declining somewhat convergent trough 116 is mounted on the main frame 96 so that it projects forwardly of the cutting station 22 from below the level of the bed plate 106. Even as a row of bags B is about to be cut from the several laterally adjacent converted feedstocks, the leading nugget-sealed ends are drooping down somewhat into proximity with the trough 116. Upon the occurrence of a cutting step, the resulting bags fall into the trough 116 and slide down it into the baffle box 26.

As shown, the baffle box 26 is an open top, open bottom, downwardly convergent hopper constituted by peripheral upstanding sidewalls 118 and endwalls 120. Inside the hopper, baffle plates 122 protrude toward the center from the two opposed sidewalls 118. The baffle plates preferably are flat, but are adjustably mounted at different heights (e.g. via pegs in adjustment holes) so as to decline from the sidewalls toward the center at various levels (typically 2–4). Each bag B which enters the baffle box 26 through its open hopper top tends to advance axially forwards and to fall downwards, striking one or more baffles in the course of becoming aligned horizontally and centrally of the hopper thereby, and is thus fully laid out substantially straight. In substantially that condition, each bag issues through the open hopper bottom and, e.g. falls a very short distance (typically a couple of inches) onto the upper horizontal row of an endless conveyor belt 28.

The conveyor belt 28 may serve yet another, or plural other bag manufacturing devices, e.g. another device just like the one 12-26, each of which ends with a respective baffle box 26 over the conveyor belt 28, between the baffle box 28 illustrated, and the inspection station 30.

At the inspection station, the succession of bags B is monitored, possibly with automatic devices, but typically by human eye, and any malformed bags spotted may be simply culled from the line. Note that preferred orientation and use of equipment relative to the inspection station places all of the bags in a single series of transversally stretched out bags coming past the inspection station with the sealed ends N nearest the inspector.

The bags which pass the inspection, upon being conveyed further typically drop off the downstream leading end of the conveyor 28 and into a carton 32 which is disposed on a weighing device 34 that has a signalling system for indicating when a carton is full, as explained above.

Typically certain parts of the apparatus, such as the baffle box 28, the chute 116 and the tubes 24 are made of a transparent material, such as glass or clear plastic, so that its throughput may be more easily monitored.

A typical length for the bags B is twenty-six inches. A typical feedstock is Dupont's Vexar tubular thermoplastic netting. A typical end product is a carton of 1000 individual bags B, or a unitary coil of 1000 bag B precursors, each marked by a seal nugget N indicating the bottom of what will become a bag B when that bag is cut or snapped from the leading end of the coil. Such coils typically may be sold spooled or cartoned.

Figure 11:
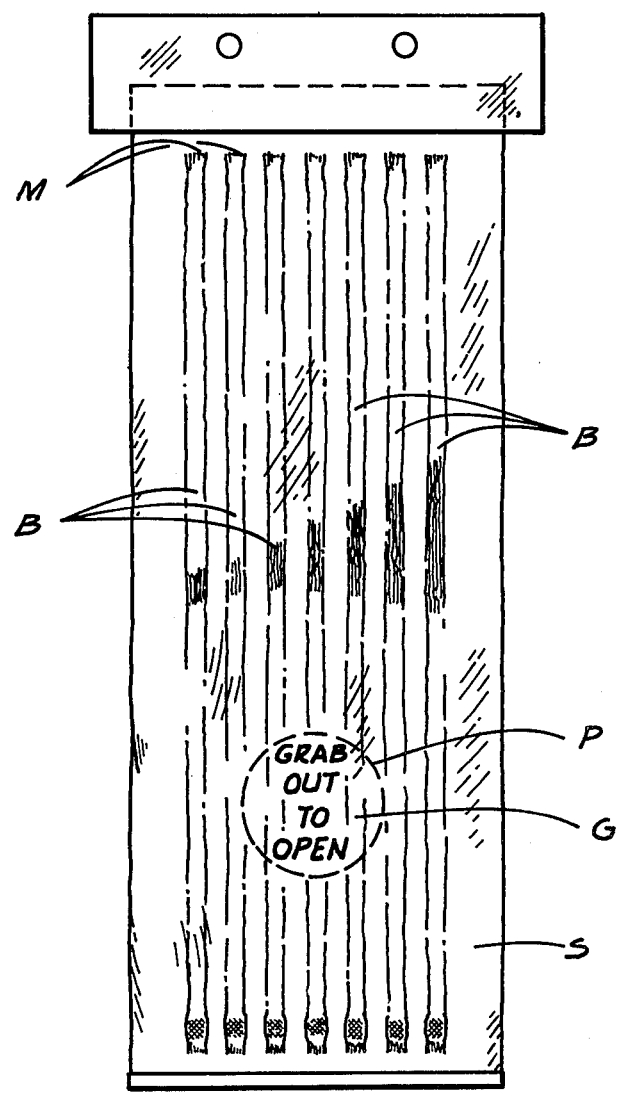
FIG. 11 is a package of a group of the FIG. 9 bags, which permits withdrawal of individual bags through a grab hole provided in the package side wall.

Another preferred form the product may take is shown in FIG. 11. Here, a group of individual bags B, typically one hundred of them, typically all with like orientation (like so many licorice sticks or soda straws) are sleeved in a tubular sack S of clear plastic film having one sealed shut end E, and a hang tag T adhered onto and closing the opposite, formerly open end thereof. The tag T is provided with one or more openings O so that the package may be conveniently hung next to a work station.

As a further elaboration, the sidewall of the sack S, perhaps six inches up from the lower, sealed shut end E is provided, when the sack S is manufactured, with an intermittantly cut through ring of perforations P which define in their midst a grab-out closure G. In order to use such a package, the worker hangs the package next to their work station, grabs out and discards the grab-out closure G, and thus creates a grab-out opening through which bags B may be withdrawn as individuals. The grab-out closure G typically is circular and three or four inches across.

It should now be apparent that the manufacture of sealed-end tubular thermoplastic net bagging as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for manufacturing sealed end unfilled tubular thermoplastic net bagging from a continuous rope-like feedstock of tubular thermoplastic net bagging material, comprising performing the following steps, repetitively, in alternation:
   (a) axially advancing said feedstock through a snug-fitting aperture of a twisting station, intermittantly pausing, gripping, and angularly twisting said feedstock at said twisting station, sufficiently to substantially fully radially condense said feedstock in the vicinity of said twisting station; and
   (b) at a sealing station which also is in the vicinity of said twisting station, following step (a), melting an axially short segment of said radially condensed feedstock into a single, massive integral seal nugget incorporating substantially all strands of said feedstock within said segment,
   thereby producing a converted feedstock of tubular thermoplastic net bagging having a respective said seal nugget incorporated therein every so often.

2. The method of claim 1, wherein:
   the melting step is accomplished by imparting ultrasonic vibrations to said material in said segment.

3. The method of claim 1, comprising the additional step of:
   (c) transversally severing said converted feedstock once beside each succeeding seal nugget to thereby change said converted feedstock into a succession of individual tubular thermoplastic netting bags, each having one open mouth, and having the opposite end thereof constituted by a respective seal nugget.

4. The method of claim 1 wherein:
   step (b) is conducted slightly downstream of said twisting station.

5. The method of claim 1, wherein:
   during step (a) the feedstock is gripped and is angularly twisted by passing the feedstock through respective, corresponding eccentrically disposed axial openings through a rotatable two-part twisting fixture having a pulley part and a drag part, and rotating the pulley part slightly in angular advance of said drag part in order to pinch and thus grip the feedstock between the pulley part and the drag part due to resultant slight angular offsetting of said eccentrically disposed axial openings.

6. The method of claim 1, wherein:
   preliminary to step (a), the continuous rope-like feedstock of tubular thermoplastic net bagging material is paid off a spool in a generally radially condensed but not significantly angularly twisted condition.

7. The method of claim 1, simultaneously conducted on a plurality of side-by-side feedstocks including and identical with said feedstock, using the same said twisting station and sealing station.

8. The method of claim 1, comprising the additional step of:
   (c) transversally only partially severing said converted feedstock once beside each succeeding seal nugget to thereby change said converted feedstock into a further converted feedstock from which individual tubular thermoplastic netting bags may be snapped by tugging briskly enough to complete formerly partial severing beside a respective seal nugget.

9. Further converted feedstock produced by the process of claim 8.

10. The method of claim 1, comprising coiling the converted feedstock without even transversally partially severing the converted feedstock beside the respective seal nuggets to provide a product from which individual bags may later be cut by cutting across the converted feedstock beside respective seal nuggets.

11. Coiled, converted feedstock produced by the process of claim 10.

12. The method of claim 2, comprising:
   leading the feedstock through a support fixture having an intermediate slot through which said segment is externally accessible;
   advancing an ultrasonic welding horn into the slot and into contact with said segment and imparting ultrasonic vibrations to said material via said ultrasonic welding horn, while said segment remains confined between said support fixture and said ultrasonic welding horn, then withdrawing the ultrasonic welding horn free of the thus-converted feedstock.

13. The method of claim 12, further comprising: generally cylindrically concavely hollowing out the slot centrally thereof across the full thickness of the slot to provide a molding cavity flanked by shoulders, so that when the ultrasonic welding horn is inserted into contact with said segment, most of said segment is forced into said molding cavity and the shoulders are available as positive stops to prevent the ultrasonic welding horn from squeezing and melting said feedstock in two while forming said seal nugget.

14. The method of claim 13, further comprising:
   using at least one of said ultrasonic sealing horn and said molding cavity, by applying superficial logo in reverse relief thereon, to moldingly form the corresponding right-reading logo on each seal nugget as each seal nugget is being formed.

15. The method of claim 2 including simultaneously forming indicia on said seal nugget as said seal nugget is formed.

16. The product of the method of claim 15.

* * * * *